(12) United States Patent
Chekansky et al.

(10) Patent No.: US 7,862,460 B2
(45) Date of Patent: Jan. 4, 2011

(54) CHAIN NOISE DAMPING DEVICE

(75) Inventors: Jason W. Chekansky, Auburn, NY (US); George L. Markley, Montour Falls, NY (US)

(73) Assignee: BorgWarner Inc., Auburn Hills, MI (US)

( * ) Notice: Subject to any disclaimer, the term of this patent is extended or adjusted under 35 U.S.C. 154(b) by 384 days.

(21) Appl. No.: 12/159,241

(22) PCT Filed: Jan. 22, 2007

(86) PCT No.: PCT/US2007/060822

§ 371 (c)(1),
(2), (4) Date: Jun. 26, 2008

(87) PCT Pub. No.: WO2007/087501

PCT Pub. Date: Aug. 2, 2007

(65) Prior Publication Data

US 2008/0293531 A1 Nov. 27, 2008

Related U.S. Application Data

(60) Provisional application No. 60/762,176, filed on Jan. 25, 2006.

(51) Int. Cl.
*F16H 55/12* (2006.01)
(52) U.S. Cl. .................. 474/163; 474/162; 474/152
(58) Field of Classification Search .......... 474/152, 474/162, 163
See application file for complete search history.

(56) References Cited

U.S. PATENT DOCUMENTS

| 4,227,422 A | 10/1980 | Kawashima et al. |
| 4,261,214 A | 4/1981 | Watanabe et al. |
| 4,348,199 A | 9/1982 | Oonuma et al. |
| 5,360,378 A * | 11/1994 | Suzuki et al. ............... 474/161 |
| 6,334,829 B1 | 1/2002 | Saito et al. |
| 6,371,874 B1 | 4/2002 | Inoue |
| 6,910,980 B2 | 6/2005 | Hamilton |
| 2002/0123403 A1* | 9/2002 | Welsh ....................... 474/152 |

FOREIGN PATENT DOCUMENTS

| DE | 19962856 | 8/2000 |
| DE | 102004042471 | 3/2006 |
| GB | 2267946 | 12/1993 |
| JP | 11092069 | 4/1999 |
| JP | 2005207503 | 8/2005 |

* cited by examiner

*Primary Examiner*—Sang Kim
(74) *Attorney, Agent, or Firm*—Brown & Michaels, PC

(57) ABSTRACT

A sprocket (S) for a chain driven power transmission system used on an internal combustion engine. Severe ITVH (Noise, Vibration, Harshness) characteristics associated with a chain engaging the sprocket is damped by two annular rings (R1, R2) that are loosely positioned on either side of the circumferential row of teeth. The inner diameters (ID1, ID2) of each of the annular rings (R1, R2) form cavities between the annular rings and the sprocket grooves. Pressurized viscous fluid is supplied to each cavity via channels in the hub of the sprocket to cushion the impact of each roller of the chain as it engages each row of teeth during engine operation. The pressure of the viscous fluid creates a resistive force to minimize the severe impact noise experienced by non-damped sprockets.

9 Claims, 6 Drawing Sheets

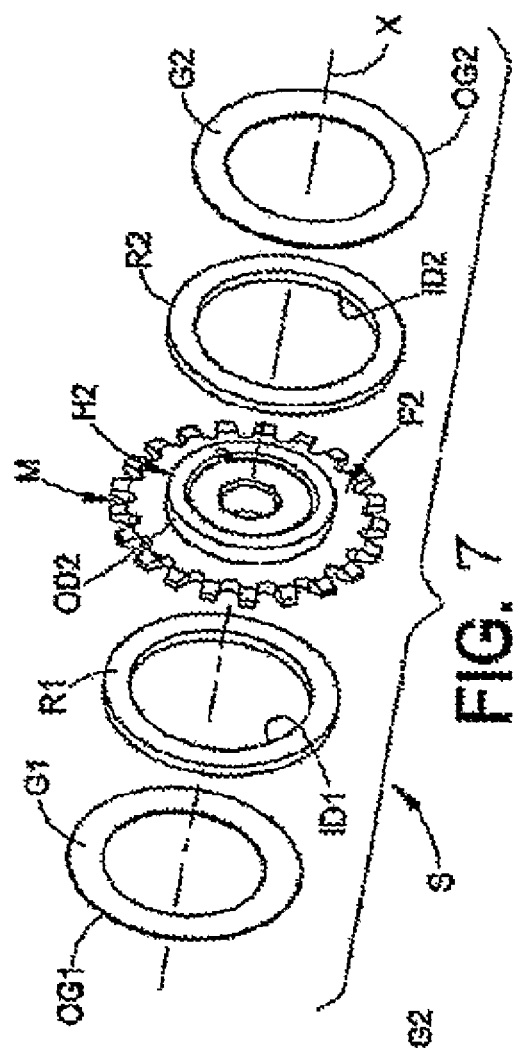
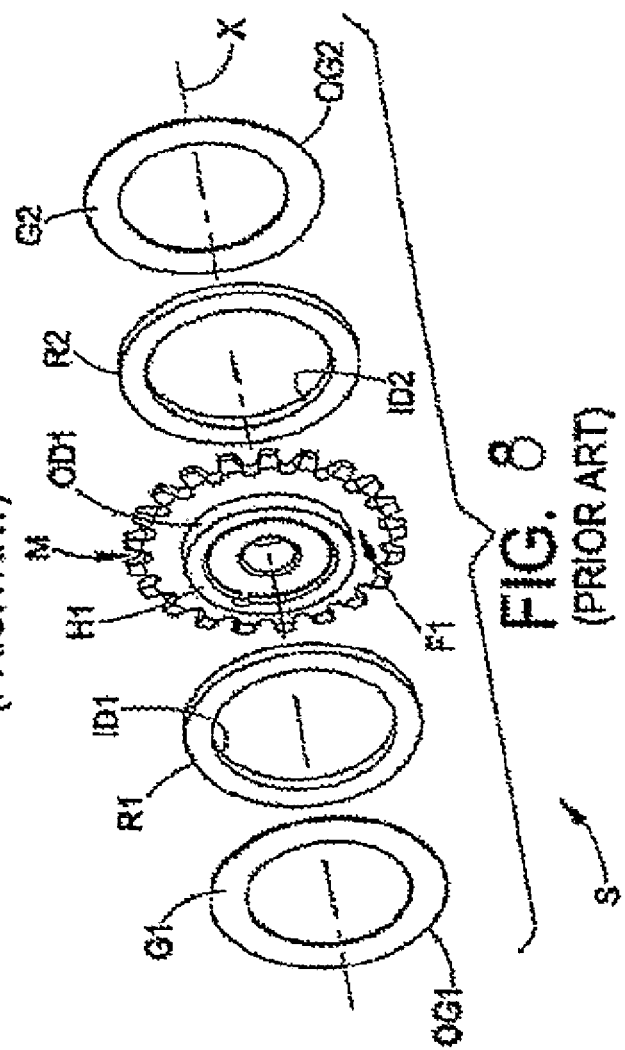
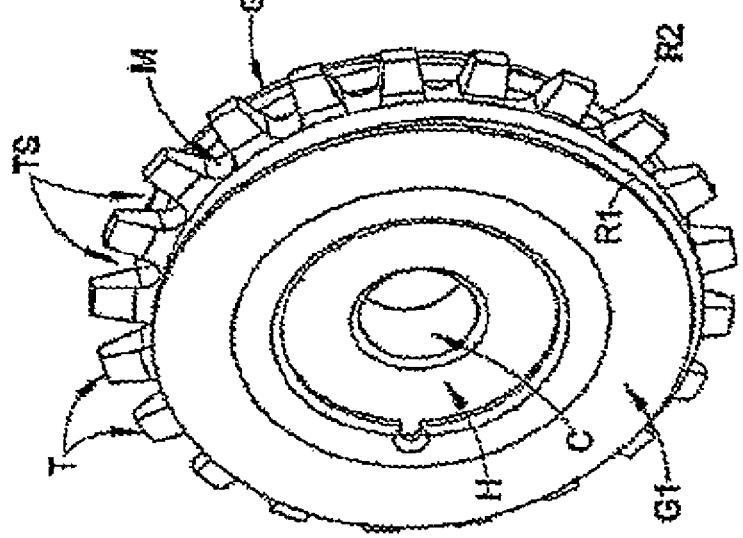

CHAIN NOISE DAMPING DEVICE

This application claims one or more inventions which were disclosed in Provisional Application No. 60/762,176, filed Jan. 25, 2006, entitled "Chain Noise Damping Device". The benefit under 35 USC §119(e) of the United States provisional application is hereby claimed. The aforementioned applications are hereby incorporated by reference.

FIELD OF THE INVENTION

The invention pertains to the field of toothed sprockets used in chain driven power transmission systems. More particularly, the invention pertains to a device that damps the noise associated with the engagement of the links of the chain with the teeth of the sprocket.

DESCRIPTION OF RELATED ART

Chains and sprockets have long been used as a means for transmitting power, timing rotary components and the like. One difficulty associated with such chain and sprocket arrangements is the impact of the chain rollers or links on the sprocket as they engage. This impact creates excessive noise and excessive wear. This impacting and the noise associated therewith are illustrated in FIG. 1 as resulting from the roller 10 of a chain, schematically illustrated as 12, impacting against the tooth 14 of a sprocket 16. The loudest noise is said to occur at the engagement starting point 18, which occurs as indicated by the distribution curve 20 along the travel of the chain.

As a result of the noise and wear associated with conventional roller chain and sprocket couplings, devices have been developed in an effort to reduce these problems. These devices have attempted to buffer the chain at this range of points 18. A first such device is illustrated in FIGS. 2 and 3 and includes circular peripheral grooves 22 and 24 on a sprocket 26 on either side of the sprocket teeth 28. Located within the grooves 22 and 24 are resiliently compressible buffer rings 30 and 32. These buffer rings 30 and 32 fit snugly in grooves 22 and 24 because of their exceptionally resilient nature. The buffer rings in FIGS. 2 and 3 provide the buffering effect through the resilient restoring force against compression of the rings 30 and 32 in resisting the link plates 34 of chain 36. This mechanism successfully reduces noise. However, because of the fixed location of the buffer rings 30 and 32 relative to the sprocket 26 and the sprocket teeth 28, rapid wear and fatigue is experienced at fixed points on the rings 30 and 32 such that the device becomes relatively impractical.

A second type of buffer ring heretofore known is illustrated in FIGS. 4 and 5. The sprocket 26 again includes circular peripheral grooves 22 and 24 on either side of sprocket teeth 28 to accommodate metallic buffer rings 38 and 40. These buffer rings have an inner diameter which is larger than the outer diameter of either of the grooves 22 and 24. Also the buffer rings 38 and 40 have a radial thickness which is less than or equal to the depth of the bottom of the grooves 22 and 24 below the inscribed circle of the link plates of the roller chain where it engages the sprocket. The inscribed circle is identified in FIG. 4 by the numeral 42.

This type of buffer ring as illustrated in FIGS. 4 and 5 can either function to deform the ring from its circular shape as illustrated in FIG. 4 or remain circular. The ring material itself is not compressed between the link plates of the chain 36 and the bottom of the grooves 22 and 24 as in the device of FIGS. 2 and 3. An advantage of the metallic buffer rings is that they constantly change position with respect to the teeth 28 of the sprocket 26 and hence do not have fixed wear spots. However, because there is still metallic on metallic contact between the rings 38 and 40 and the grooves 22 and 24, maximum noise abatement cannot be achieved.

FIGS. 6-8 illustrate a conventional cushion ring sprocket S as is well known by those of ordinary skill in the art. The sprocket S comprises an annular member or portion M comprising a plurality of circumferentially spaced teeth T projecting radially outward therefrom. The teeth T are separated by tooth spaces TS. The teeth T engage an associated chain (not shown).

The sprocket S further comprises a hub H connected to or defined as a one-piece construction with the annular toothed portion M. First and second portions H1, H2 of the hub H project axially outwardly from the opposite first and second axial faces F1, F2 of the annular portion M. The first and second hub portions H1, H2 include or define respective cylindrical outer diameters OD1, OD2. As noted, the hub H and annular portion M can be assembled from separate structures or can be defined as a one-piece construction. The annular toothed portion M and hub H together define a sprocket body B that rotates about an axis of rotation X. A recess or through-bore C is defined in the hub about the axis of rotation X. The recess or bore C receives a shaft or other member that rotates with or rotatably supports the sprocket body B. The sprocket body B is typically constructed from a suitable metal by casting, machining, or powdered metal forming techniques. However, other suitable means and/or materials may be used.

First and second circular cushion rings R1, R2 are provided and are loosely received on the respective cylindrical outer diameters OD1, OD2 of hub portions H1, H2, i.e., the cushion rings R1, R2 define inner diameters ID1, ID2 that are larger than the outer diameters OD1, OD2 on which the rings are received so that the rings R1, R2 can eccentrically float on the outer diameters OD1, OD2.

The cushion rings R1, R2 are moveably captured or trapped on the hub portions H1, H2 by radially enlarged flanges G1, G2 that are fastened, welded or otherwise connected to the hub portions H1, H2, respectively. The flanges 61, G2 define respective circular outer diameters OG1, OG2 that are larger than the cushion ring inner diameters ID1, ID2 so as to trap the cushion rings loosely between the faces F1, F2 and flanges G1, G2, respectively.

The cushion rings R1, R2 are typically made from metal and, in use, are contacted by chain links of an associated chain (not shown) engaged with the sprocket teeth T. The cushion rings R1, R2 eccentrically float on the hub outer diameters OD1, OD2 under force of the chain links and act to buffer or soften the impact of the associated chain with the sprocket S which leads to a decreased noise level.

SUMMARY OF THE INVENTION

The present invention is a buffer device for a chain and sprocket coupling which provides maximum chain engagement cushioning with minimal chain engagement noise. An annular cushioning ring with low wear characteristics slidably fits in a groove adjacent to the sprocket teeth, with an outside diameter larger than the inscribed circle created by the chain link plates when engaged with the sprocket. Pressurized viscous fluid is channeled through the sprocket hub to the cavity between the sprocket groove and cushioning ring inside diameter. The fluid flow rate and axial movement of the cushioning ring is limited by the tight clearance between the sprocket, the cushioning ring, and the radial flange, which is preferably press-fit on the sprocket. The cushioning ring and radial flange are not limited to one side or the other of the sprocket teeth, but may be applied to each side of the sprocket hub.

The presence of the pressurized fluid damps the transmission of the impact energy, particularly noise, of the cushion ring to the sprocket hub by softening the metal-to-metal contact of the chain with the sprocket, thus reducing chain engagement noise.

The effect of the motion of the fluid mass significantly improves shock absorption and vibration reduction as the engaging chain strand first contacts the cushion ring and then the sprocket teeth. This resists the tendency of the chain to alter the position of the cushion ring, which damps chain motion.

The buffer device of this invention provides improved damping during periods of reversed loading, when chain tension alternates between the operational tight and slack strands. The motion of the fluid mass damps chain motion and impact energy associated with alternating chain tension, and noise prevention is effectively attained.

This invention is applicable to roller chains and other forms of power transmission chains having pins and links, such as toothed chains or silent chains.

BRIEF DESCRIPTION OF THE DRAWINGS

FIG. 6 is an isometric illustration of a conventional cushion ring sprocket.

FIG. 7 is an exploded isometric view of the sprocket shown in FIG. 6.

FIG. 8 is also an exploded isometric view of the sprocket shown in FIG. 6.

DETAILED DESCRIPTION OF THE INVENTION

Figure 1:
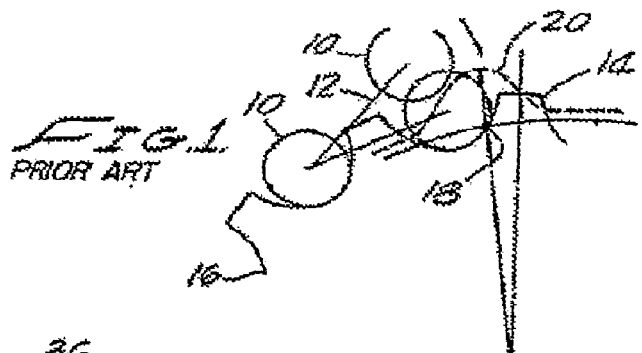
FIG. 1 is a schematic illustration of the coupling between a roller chain and a sprocket.
Figure 2:
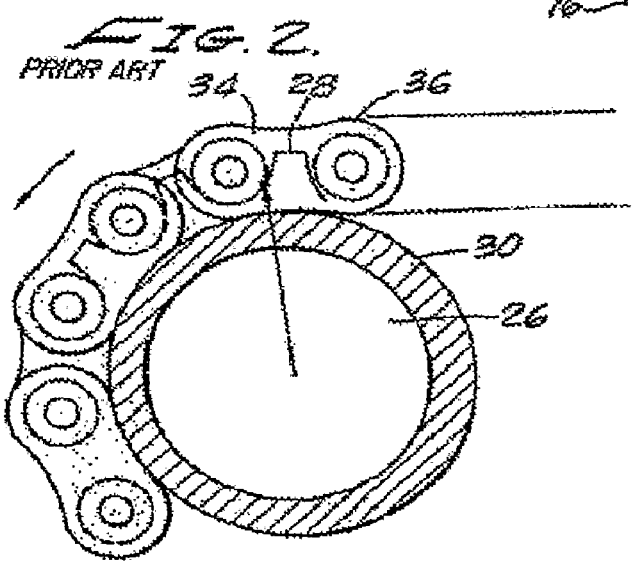
FIG. 2 is a side view of a prior art buffer ring, as associated with a roller chain and sprocket coupling.
Figure 3:
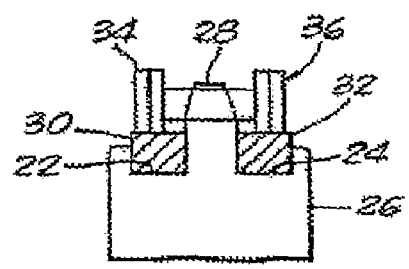
FIG. 3 is a schematic illustration showing a cross-section of the device of FIG. 2.
Figure 4:
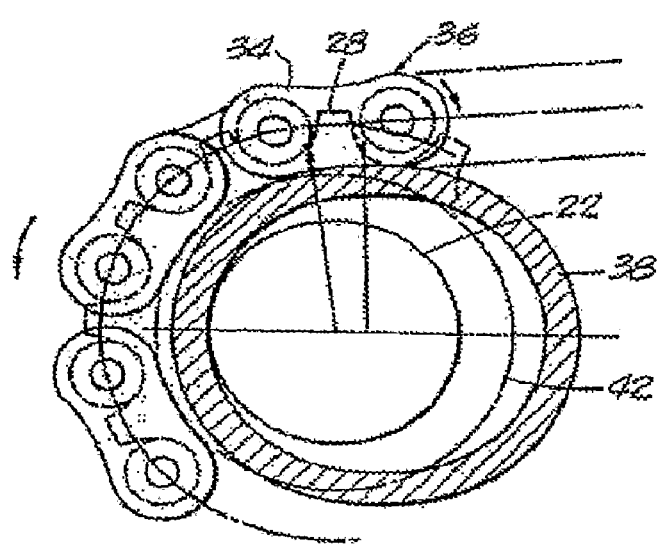
FIG. 4 is a side view of a floating prior art buffer ring.
Figure 5:
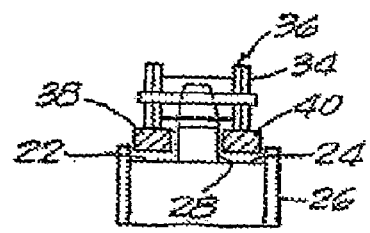
FIG. 5 is a schematic illustration showing the buffer ring mechanism of FIG. 4 in cross-section.
Figure 9:
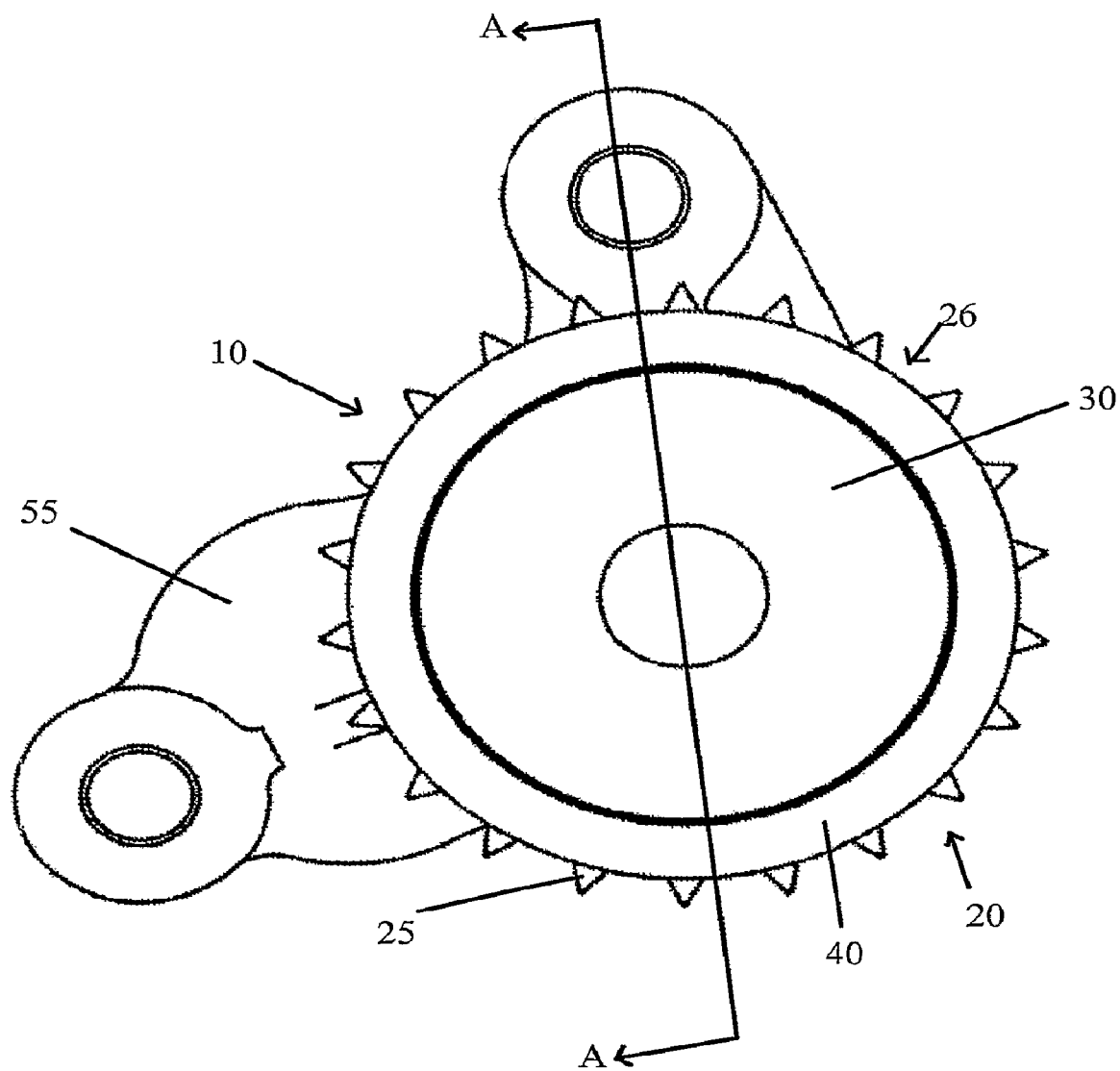
FIG. 9 is a front view of the present invention in association with an idler shaft or stub shaft.
Figure 12:
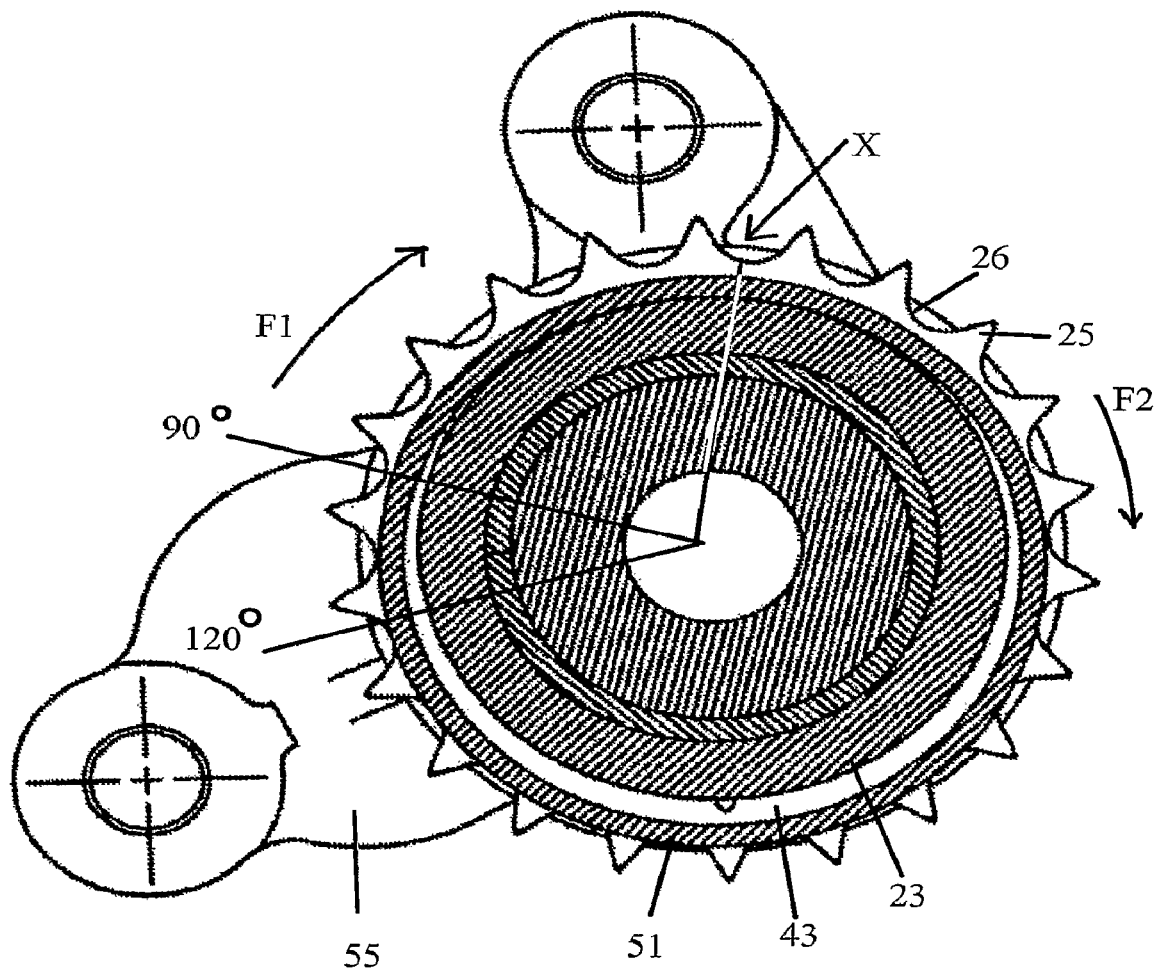
FIG. 12 is a cross section of the distal annular ring on the sprocket hub assembly along line B-B of FIG. 10.

Referring to FIG. 9, a frontal view of the present invention is shown. The invention consists of a damped sprocket assembly 10 that is securely affixed to an internal combustion engine by support housing 55. The damped sprocket assembly 10 contains a sprocket 20, which contains a hub 30, an annular portion 40 and a continuous circumferential row of spaced apart radially projecting teeth 25. The teeth are separated from each other by tooth gaps 26 having a radius. The radius of each tooth gap 26 is best shown in FIG. 12 and is designed to match the radius of each of the multiple rollers of the chain (not shown) that operatively engage the sprocket. Sprocket 20 either provides a force to the chain to drive another sprocket, as indicated by the arrow F1, or receives a driving force, as indicated by the arrow F2, from another sprocket via the chain to drive sprocket 20. This force is transmitted by the engagement of the chain rollers within the tooth gaps 26 of the sprocket 20. The impact of the engagement between the rollers and the tooth gaps 26 of the sprocket 20 results in undesirable NVH (noise, vibration, harshness) characteristics.

The present invention may be utilized on sprockets that are affixed to various types of drive or driven shafts. Non-limiting examples include drive shafts, camshaft timing drives, oil pump drives, balance shaft drives and fuel pump drives.

Figure 10:
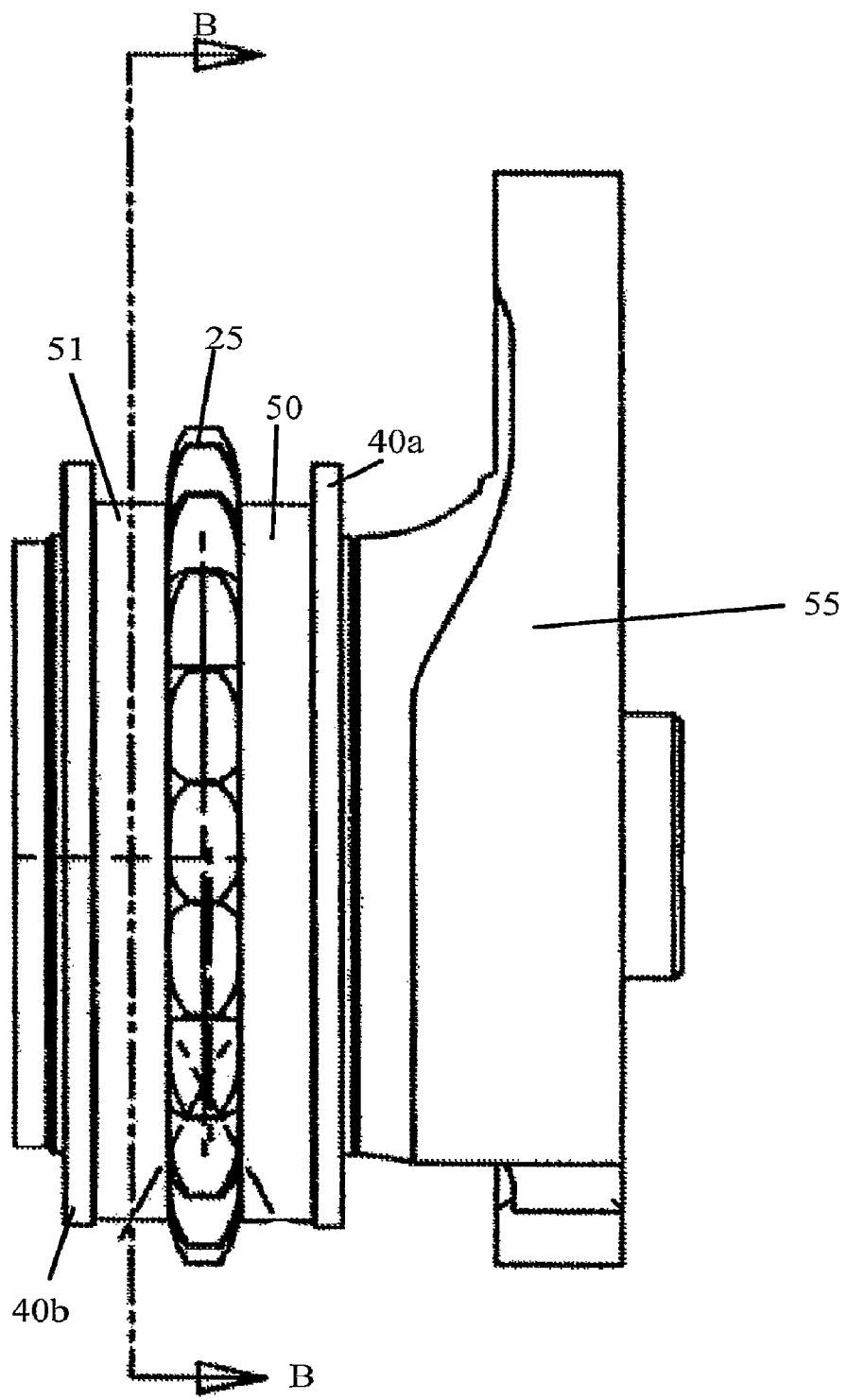
FIG. 10 is a side view of FIG. 9.
Figure 11:
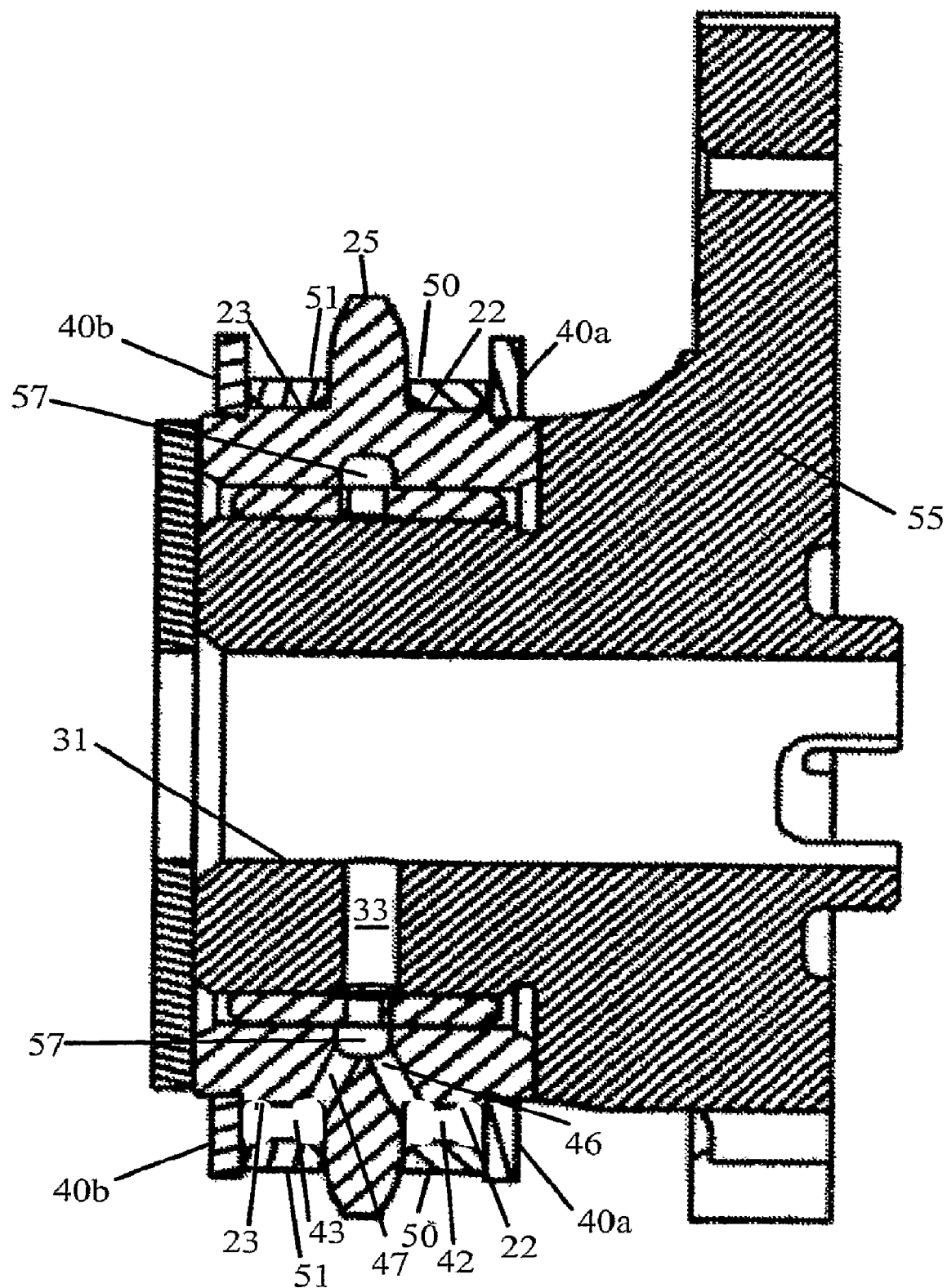
FIG. 11 is a section view along line A-A of FIG. 9.

The present invention mitigates the negative effects of NVH by employing annular rings. Referring now to FIGS. 10 and 11, a proximal annular ring 50 is positioned between the row of teeth 25 and the support housing 55 for the stub shaft 11 and the idler shaft 12. The proximal annular ring 50 is prevented from falling off of the sprocket 20 by an annular sprocket flange 40a. The area between the proximal annular sprocket flange 40a and the row of teeth 25 is the proximal sprocket groove 22, which is best shown in FIG. 11. A distal annular ring 51 is located on the other side of and adjacent to the row of teeth 25. Distal annular ring 51 is prevented from falling off of the sprocket 20 by annular sprocket flange 40b. The area between the distal annular sprocket flange 40b and the row of teeth 25 is the distal sprocket groove 23, best shown in FIG. 11.

The annular rings are made from a high strength, low wear material, so that they can withstand forceful engagement with the chain over an extremely long period of time. A hardened steel alloy is a most desired material. Other suitable materials are within the contemplation of the present invention so long as they are able to survive the harsh mechanical environment in which they perform.

The inner diameters of annular rings 50 and 51 are larger than the outer diameters of their respective sprocket grooves 22 and 23. The force associated with the engagement of the chain with the row of teeth 25 on sprocket 20 urges the inner diameter of proximal ring 50 to forcefully abut the outer diameter of the proximal sprocket groove 22 and the inner diameter of distal ring 51 to forcefully abut the outer diameter of the distal sprocket groove 23 at approximately the furthermost point from the opposing sprocket, designated generally as X. This is the point of maximum abutment or contact force. Moving around the sprocket in either direction from the location X, a gradually enlarging cavity is formed between the inner diameter of the proximal annular ring 50 and the proximal sprocket groove 22, designated as proximal cavity 42. A corresponding cavity, designated as the distal cavity 43, is formed between the inner diameter of the distal annular groove ring 51 and the distal sprocket groove 23.

A pressurized viscous fluid, preferably hydraulic fluid, most preferably engine oil is forced into hub channel 33 from an oil feed means in the support housing 55 which is inserted into the inner diameter 31 of the hub 30. The hub channel 33 feeds pressurized viscous fluid into at least one annular fluid channel 57, which, in turn, feeds the proximal cavity 42 and the distal cavity 43 via a proximal feed channel 46 and a distal feed channel 47, respectively.

In the operation of chain and sprocket assemblies, the most noise is produced by the forceful impact of each roller in the chain linkage against the radius in the gaps between the teeth. In the operation of the present invention, except for the forced abutment of the larger diameter annular rings at the single point of contact X, the pressurized viscous fluid forcefully urges each annular ring outward from the outer diameter of its respective groove. Referring to FIG. 12, as the chain approaches engagement with the sprocket, the links between the rollers will gently begin contacting the annular rings at approximately 120 to approximately 90 degrees before the point of maximum abutment X. As the sprocket continues to rotate, as in this example, in a clockwise direction, as shown by the arrows F1 and F2, the pressurized viscous fluid will provide an increasingly higher resistive force against the chain, so that by the time the rollers begin contacting the edges of the teeth 25 within each tooth gap, they are eased into full engagement within the radius between each tooth, thereby minimizing the high impact forces and sounds experienced by non-damped systems.

A further advantage of the present invention is its ability to provide damping during periods of reverse loading, such as when chain tension alternates between operational tight and slack strands. This is best characterized by reverses in the direction of force F, shown in FIG. 12. The viscous motion of the fluid mass in the cavities between the annular rings and the sprocket damps the noise resulting from severe fluctuations in the motion of the chain and the impact energy associated with changes in chain tension.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A damped sprocket assembly for a chain driven power transmission system comprising
    a) a sprocket body pivotally secured to a support housing, the sprocket body having a central hub portion having an axial bore and a continuous row of spaced apart radially projecting teeth on an annular circumference of the sprocket body;
    b) a proximal annular flange positioned between the spaced apart radially projecting teeth and the support housing and a distal annular flange located on the other side of the continuous row of spaced apart radially projecting teeth;
    c) a proximal groove having a diameter located between the proximal annular flange and the continuous row of spaced apart radially projecting teeth;
    d) a distal groove having a diameter located between the distal annular flange and the continuous row of spaced apart radially projecting teeth;
    e) a proximal ring having an inner diameter loosely positioned within the proximal groove, the inner diameter of the proximal ring being larger than the diameter of the proximal groove defining a proximal cavity;
    f) a distal ring having an inner diameter loosely positioned within the distal groove, the inner diameter of the distal ring being greater than the diameter of the distal groove defining a distal cavity;
    g) at least one annular fluid channel located between the hub and the continuous row of spaced apart radially projecting teeth;
    h) a distal feed channel for transmitting fluid to the distal groove and a proximal feed channel for transmitting fluid to the proximal groove, the distal and proximal feed channels being in functional communication with the at least one annular fluid channel to provide a passage for the flow of fluid; and
    i) a channel located within the hub for transmitting fluid from the axial bore to the at least one annular fluid channel.

2. The damped sprocket assembly of claim 1 wherein the distal and proximal annular rings are made of a high strength, low wear material.

3. The damped sprocket assembly of claim 2 wherein the high strength, low wear material is a hardened steel alloy.

4. The damped sprocket assembly of claim 1 wherein the fluid is pressurized.

5. The damped sprocket assembly of claim 4 wherein the fluid is pressurized hydraulic fluid.

6. The damped sprocket assembly of claim 5 wherein the pressurized hydraulic fluid is pressurized engine oil.

7. The damped sprocket assembly of claim 1 wherein each of the radially projecting teeth are separated by a tooth gap having a radius.

8. The damped sprocket assembly of claim 7 wherein the chain has intermittent rollers connected by links, the rollers having an outer diameter that is the same as the radius of each tooth gap.

9. The damped sprocket assembly of claim 7 wherein the links forcibly engage the annular rings.

* * * * *

UNITED STATES PATENT AND TRADEMARK OFFICE
CERTIFICATE OF CORRECTION

| | | |
|---|---|---|
| PATENT NO. | : 7,862,460 B2 | Page 1 of 1 |
| APPLICATION NO. | : 12/159241 | |
| DATED | : January 4, 2011 | |
| INVENTOR(S) | : Chekansky et al. | |

It is certified that error appears in the above-identified patent and that said Letters Patent is hereby corrected as shown below:

(57) ABSTRACT – line 2: --ITVH-- should read "NVH"

Signed and Sealed this
Twenty-ninth Day of January, 2013

David J. Kappos
*Director of the United States Patent and Trademark Office*